C. H. HEADLEY.
ATTACHMENT FOR AUTOS.
APPLICATION FILED APR. 9, 1920.
1,387,775.
Patented Aug. 16, 1921.
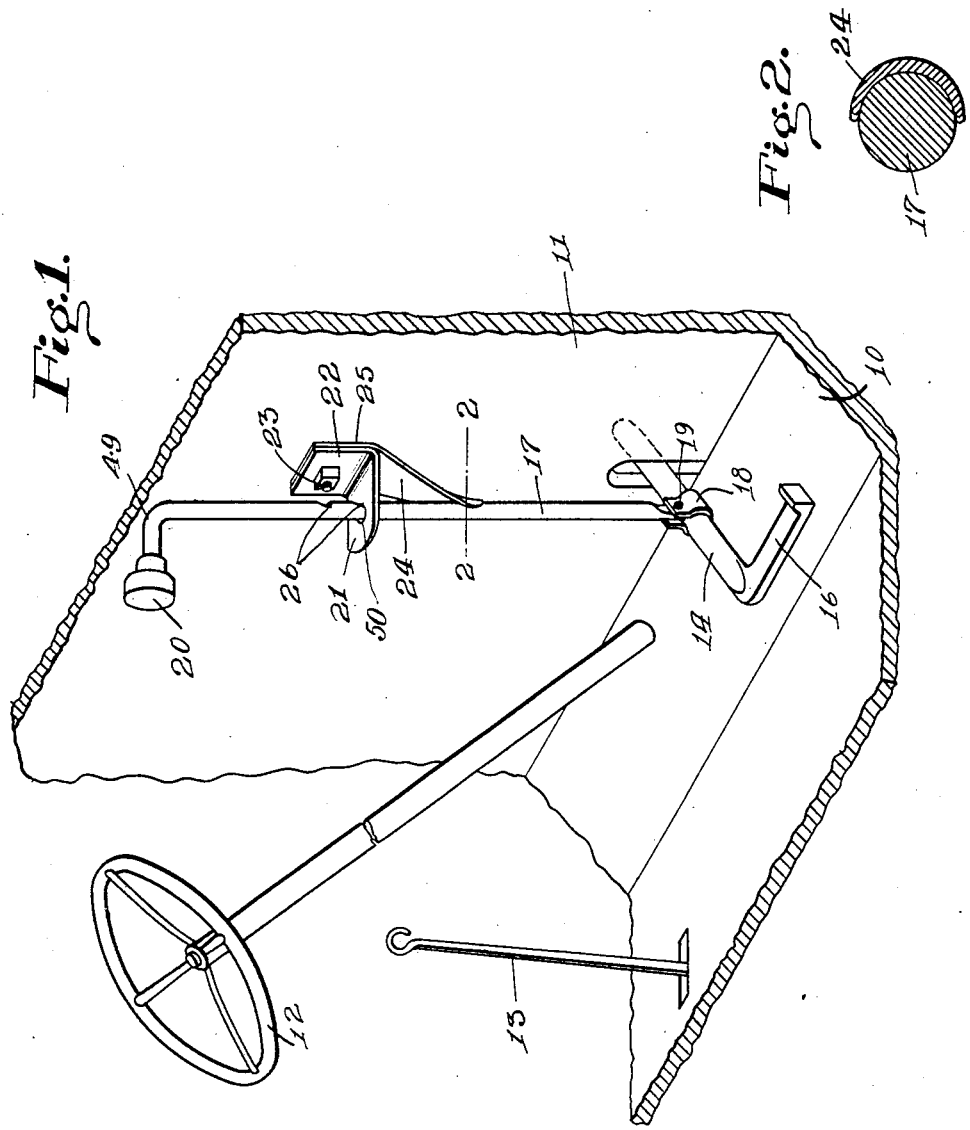
Inventor
C. H. Headley.
Witness
By C. A. Snow & Co.
Attorneys

UNITED STATES PATENT OFFICE.

CLARENCE H. HEADLEY, OF SHERBURN, MINNESOTA.

ATTACHMENT FOR AUTOS.

1,387,775.   Specification of Letters Patent.   Patented Aug. 16, 1921.

Application filed April 9, 1920. Serial No. 372,537.

*To all whom it may concern:*

Be it known that I, CLARENCE H. HEADLEY, a citizen of the United States, residing at Sherburn, in the county of Martin and State of Minnesota, have invented a new and useful Attachment for Autos, of which the following is a specification.

The device forming the subject matter of this application is adapted to be employed for holding the clutch pedal of a Fordson tractor depressed, and the invention aims to provide a device of the sort above mentioned which, being mounted upon the dash board, will encumber the foot board to a minimum extent.

In the drawings:—

Figure 1 shows in perspective, a portion of a Fordson tractor, whereunto the device forming the subject matter of this application has been applied; Fig. 2 is a cross section on the line 2—2 of Fig. 1.

The numeral 10 denotes a foot board, the dash board being denoted by the numeral 11. The vertically movable clutch pedal is denoted by the numeral 14 and is provided with a lateral tread piece 16. The steering wheel appears at 12 and the gear shift lever is shown at 13.

A guide in the form of an angle bracket 22 is provided, the same having a rearwardly extended flange 21 provided with an opening 50. A securing device 23 connects the bracket 22 to the dash board 11. The numeral 24 marks a spring tongue, one end 25 of which is bound between the angle bracket 22 and the dash board 11, the securing element 23 passing through the end 25 of the tongue. The tongue 24 is inclined rearwardly, away from the dash board 11 and is concaved transversely as shown in Fig. 2, to correspond with the cross section of a rod 17 mounted to move in the opening 50 on the flange 21 of the angle bracket 22. A clamp 18 is held by a bolt 19 on the pedal 14 and forms a pivotal mounting for the lower end of the rod 17. The upper end of the rod 17 is fashioned into a handle including a rearwardly extended end 49 and a knob 20. The forward edge of the rod 17 is provided with notches 26, adapted to engage one at a time with the flange 21 of the angle bracket.

The pedal 14 may be depressed, the rod 17 being swung forwardly, the operator grasping the knob 20. The flange 21 of the angle bracket or guide 22 is caught in one of the notches 26, and the pedal is held depressed. A slight depression of the pedal 14 will render the rod 17 responsive to the action of the spring tongue 24, the tongue disengaging the notch 26 from the flange 21 and permitting the rod 17 to move upwardly.

Since the rod 17 is disposed approximately parallel to the dash board 11 and in view of the fact that the guide bracket 22 is mounted on the dash board, the foot board 10 remains unencumbered, it being a matter of common knowledge that it is desirable to dispose as few operating devices as possible upon the foot board.

Having thus described the invention what I claim is:

In a device of the class described, a vertical dash board; a vertically movable clutch pedal; a guide projecting rearwardly from the dash board; a vertical rod disposed approximately parallel to the dash board and slidably mounted in the guide, the rod being pivoted at its lower end to the pedal, and having a notch in that edge which is adjacent to the dash board, the notch coacting with the guide to hold the rod and the pedal depressed, the rod being provided at its upper end with a handle projecting away from the dash board; and a depending spring having its upper end bound between the guide and the dash board, the lower end of the spring exerting a pressure on the rod, the lower end of the spring being trough-shape in cross-section, to receive the rod and to direct the notch into engagement with the guide.

In testimony that I claim the foregoing as my own, I have hereto affixed my signature in the presence of two witnesses.

CLARENCE H. HEADLEY.

Witnesses:
 FRANK COLLINS,
 C. E. KENDALL.